United States Patent [19]

Policelli

[11] Patent Number: 4,530,379
[45] Date of Patent: Jul. 23, 1985

[54] FILAMENT WOUND INTERLAMINATE TUBULAR ATTACHMENT

[75] Inventor: Frederick J. Policelli, Cumberland, Md.

[73] Assignee: Hercules Incorporated, Wilmington, Del.

[21] Appl. No.: 652,162

[22] Filed: Sep. 19, 1984

Related U.S. Application Data

[63] Continuation of Ser. No. 372,426, Apr. 27, 1982, abandoned.

[51] Int. Cl.³ .............................................. F16L 9/22
[52] U.S. Cl. ................................. 138/109; 138/141; 138/143; 220/414; 285/149; 464/182
[58] Field of Search ............... 138/103, 108, 109, 130, 138/132, 139, 141, 143, 144, 155, 174; 220/414; 285/47, 149, 238; 464/181, 182, 183

[56] References Cited

U.S. PATENT DOCUMENTS

| 2,076,632 | 4/1937 | Goodall | 285/149 X |
|---|---|---|---|
| 2,241,926 | 5/1941 | Ryan et al. | 138/127 X |
| 2,744,043 | 5/1956 | Ramberg | 156/155 |
| 3,341,052 | 9/1967 | Barthel | 220/414 X |
| 3,357,594 | 12/1967 | Grosh et al. | 220/414 |
| 3,358,867 | 12/1967 | Skinner | 220/414 X |
| 3,651,661 | 3/1972 | Darrow | 464/181 |
| 3,680,584 | 8/1972 | Pierart | 138/143 |
| 3,763,001 | 10/1973 | Withers | 204/16 |
| 3,866,792 | 2/1975 | Minke | 220/72 |
| 4,053,081 | 10/1977 | Minke | 220/3 |
| 4,157,781 | 6/1979 | Cecka | 138/144 X |
| 4,185,472 | 1/1980 | Yates et al. | 464/181 |
| 4,187,135 | 2/1980 | Yates et al. | 156/187 |
| 4,236,386 | 12/1980 | Yates et al. | 464/181 |

Primary Examiner—Stephen Marcus
Assistant Examiner—Mark Thronson
Attorney, Agent, or Firm—Edmund C. Ross, Jr.

[57] ABSTRACT

A hollow filament wound tube having a plurality of cylindrical, hollow, open ended load bearing shells embedded between radially spaced layers of fiber of the filament wound tube, the shells having a longitudinal dimension less than that of the filament wound tube.

6 Claims, 19 Drawing Figures

FILAMENT WOUND INTERLAMINATE TUBULAR ATTACHMENT

This application is a continuation of application Ser. No. 372,426, filed Apr. 27, 1982, now abandoned.

BACKGROUND OF THE INVENTION

1. Field of Use

This invention relates to mechanically joining a hollow composite tube of filamentary material that is composed of glass, graphite, aramid, boron or other such filaments and a polymer matrix to a metallic end connection fitting or to other tubes which are of same or like configurations. The invention has application where it is desirable to transfer torsional, bending and axial forces to an external or internal structural part from a composite tube containing the joined end fitting such as in a rocket motor casing, a fluid conveyance pipe, a pressurized fluid containment vessel, a torque transmitting shaft, and a load transmitting structural strut all of which employ a composite tube.

2. Prior Art

In the field of metal-to-composite joints, the connection of the metal fitting or the external structure to the filamentary composite tube has not been made in a manner as to take full advantage of the multiplicity of load transfer planes within the tube. Such cases of prior art are those where the fitting or external structure is bonded together with the composite tube through a singular plane being either internal or external to the fitting and where the singular plane is either uniform as a cylinder or non-uniform as a spline, knurled or otherwise interrupted for the purpose of increasing penetration of the fitting surface into the composite tube material. The present invention takes full advantage of multiplicity of load transfer planes occurring between each layer of the composite tube by having intermediate shells of material located at each plane all of which carry the load to a second point of transfer.

In other cases of prior art in metal-to-composite joints, connections have been made by radially pinning or bolting through the composite tube into the fitting. In this manner, the load is transferred through bearing stresses in the composite tube layers which have limited and very low bearing strength compared with that of metal. The present invention incorporates metal shells by which the load is in turn transferred through a continuous fusion weld to the fitting or adjacent structure or by a much greater bearing strength of the metal shells thru pins, bolts or rivets.

In still other cases of prior art, metal shims have been used to axially reinforce the regions locally around bolt holes. In this manner, circumferential loads and torsional shear loads cannot be transferred from the composite layers to the bolts. The present invention uses metal shells extending around, between and beyond fasteners which efficiently transfer torsional shear and axial loads and carry circumferential loads in the entire embedded zone.

OBJECTS OF INVENTION

A primary object of the present invention is provision of a joinable tube having the embedment of a multiplicity of metal shells into a filamentary composite tube.

Another object is the provision of such a tube that can use an adhesive layer of selected thickness between each adjacent embedded shell surface and filamentary layer surface to minimize peaking shear stresses which normally occur under loading at the ends of the common areas of shell and layer construction.

Another object is the provision of such a tube having an extension of the metal shells beyond the ends or termination of the filament layers of the composite tube.

Another object is the provision of such a tube having a multiplicity of spacer shells contained between the extended portion of the embedded and extended metal shells which are for the purpose of stabilizing or supporting the extended shells in those applications which introduce circumferential loads in the joint connection. Examples of such applications include fluid pressure containment vessels and rocket motor cases.

An object in accordance with a further aspect of the present invention is construction of the composite tube of a multiplicity of two types of layers being principally circumferential and axial wherein the circumferential layers are ended at the beginning of the embedded metal shells.

Another object is the joining of the extended metal shells by fusion welding to an adjoining metal structure, or to a metal fitting which can be assembled and disassembled to an adjoining structure, or to yet another composite tube containing embedded and extended metal shells.

Another object is the joining of the extended metal shells by mechanical fasteners to an adjoining structure, or to a fitting, or to another tube containing embedded and extended metal shells.

An object in accordance with a still further aspect of the present invention is the joining of external or internal fittings or fittings having both internal and external members by fasteners being a pin, bolt or rivet secured through holes drilled radially through that zone of the composite tube containing the embedment of the metal shells.

An object in accordance with a still further aspect of the present invention is the joining of external or internal fittings or fittings having both internal and external members by fasteners being a pin, bolt or rivet secured through holes drilled radially through that zone of the composite tube containing embedded shells wherein the shells are filamentary composite shells composed of glass, graphite, aramid or boron filaments and a polymer matrix.

SUMMARY OF THE INVENTION

This invention concerns the mechanical joining of layered filamentary composite structural tubes containing a multiplicity of embedded load carrying shells to adjoining structures or structural fittings in an efficient manner as to transfer all essential loads or forces there between. In particular the forces are first transferred principally by shear from the layers of the tubes into the intermediate shells and then in turn to the adjoining structure or fitting by means of fusion welding, mechanical fasteners or the like.

DETAILED DESCRIPTION OF INVENTION

Figure 1:
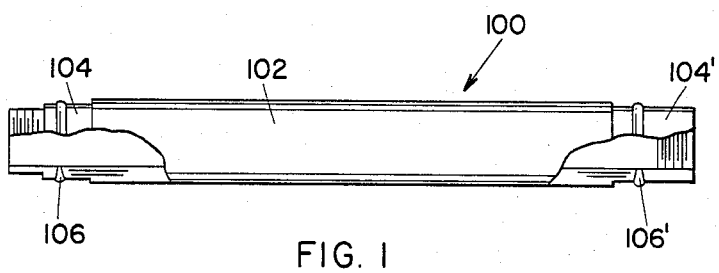
FIG. 1 is a longitudinal view of a tube having typical end fittings which are internal and external threaded couplings. The tube is partially in section to depict positioning of metal shells in the tube in accordance with this invention.

FIG. 1 illustrates a pipe 100 which utilizes the present invention at both its ends. Tube 102 is a hollow cylinder fabricated using a multiplicity of composite layers where each layer contains such filaments as graphite, glass, aramid or boron and a polymer matrix such as epoxy or polyester resin. This tube body is lighter than steel and can be fabricated to exhibit high strength and rigidity by selective use of filament patterns in each of the layers. The pipe illustrated is employed in the conveyance of fluids. As such, end fittings 104,104' attached at the ends of tube 102 are for the purpose of connecting pipe 100 to other pipes. Each fitting is joined by respective fusion weld 106,106' to respective metal sleeves which are embedded in the layered tube body as illustrated with greater detail in FIG. 2.

Figure 2:
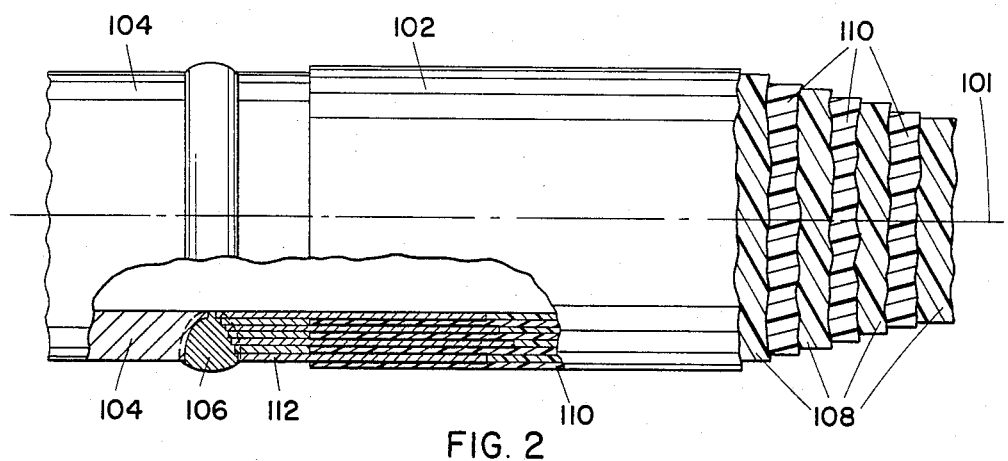
FIG. 2 shows schematically further detail of the welded connection and the layered construction of a tube body of this invention.

The various layers of the tube body are shown in FIG. 2 consisting of both circumferential layers 108 and helical layers 110. A helix angle of ±15° to the tube axis 101 is appropriate for this pipe application. Location of the cylindrical metal sleeves 112 are such as to occupy the circumferential layer position within the zone of the embedment part of which zone is shown more particularly in FIG. 3. In this manner, the metal sleeves 112 provide the necessary hoop strength to the tube at its ends which is normally provided by the circumferential layers in the main composite body of the tube 102. In this manner also, the metal sleeves 112 are adjacent to the axial layers and transfer axial forces of the joint directly into the helical layers 110 by shear. Very thin film, cylindrical layers of adhesive 114 are used between the metal sleeves and the helical layers 110 to substantially reduce the magnitude of peak shear stresses which ordinarily occur, under load, within and at the ends between the metal and composite layers. Other metal sleeves, i.e. hollow cylindrical spacers 116 are used between the embedded sleeves to provide stability and resist internal pressure within the pipe.

Dimensions of the sleeve thicknesses and embedment lengths and the composite layer thicknesses are principally a function of the pipe diameters, desired internal fluid pressure and properties of the selected sleeve and layer material composition. An example of these dimensions for pipe 100, which has a 10 inch inside diameter, is required to contain an internal fluid pressure of 2000 psi, and is constructed of steel sleeves and graphite filament epoxy composite, is:

a thickness for each of the metal sleeves 112 of 0.020 inch;

thickness for each of the circumferential layers 108 of 0.024 inch;

a thickness of each of the adhesive layers 114 of 0.002 inch;

an average embedment length of 3.8 inches respectively measured along longitudinal axis 101 from between the end of the circumferential layers 108 and the end of the helical layers 110;

a thickness of each of the helical layers 110 of 0.012 inches; and each such helical layer has a filament orientation with respect to a line parallel to center longitudinal axis 101 of between about ±15°.

Fabrication of a fluid conveyance pipe containing welded end fittings described above is performed in two general processes. The first general process is for the purpose of making the composite tube body together with the embedded sleeves at the ends. In this first process and considering FIGS. 2 and 3, a first metal sleeve (identified in FIG. 3 as A) being of a solid hollow, open ended cylindrical shape or of a sheet formed into such cylindrical (or substantially cylindrical) shape and having the adhesive layer identified as B applied to it, is positioned on a filament winding mandrel. This is followed by the construction of the first tube body layer (the circumferential layer identified as C) which is circumferentially filament wound. Following further is the construction of a second filamentary layer (the helical layer identified as D) which is helically filament wound over the first layer and over the sleeve A in a normal fashion continuing over and around the end of the mandrel. This layer is first B-staged and then cut through location E and the end material of the filament wound layer is removed. The portion of the first process described to this point is repeated a number of times or in particular three times to construct the number of layers illustrated by FIGS. 1, 2 and 3. After completion of the last layer, the entire assembly is heated to thermally cure the resin matrix. After cooling, the mandrel is removed.

The second general process (again considering FIGS. 2 and 3) is for the joining end fitting 104 to the ends of the metal sleeves 112 that extend axially from tube 102 beyond helical layers 110. The process is performed in the normal fashion of fusion welding using several circumferential passes beginning from the inside of the cylindrical welded joint area to form fusion weld 106. During the process of welding, heat produced in the metal sleeves 112 is prevented from reaching the composite layers (especially helical layers 110) by employing a cooling zone about the layers by such means as water immersion or by a cooling jacket.

Figure 4:
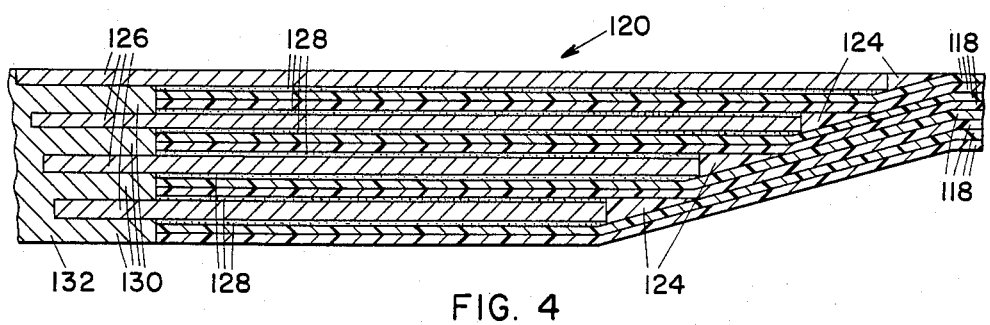
FIG. 4 is a cross-section of an alternative shell embedment geometry in the end of a tube where all tube layers are made to pass into the embedment zone.

An alternative geometry for embedment of metal sleeves in a tube body is shown in FIG. 4. In this construction, all of the fibrous composite layers 118 of the tube body 120 are taken into the embedment zone permitting a wider choice of axial angles of filaments in the layers. This embodiment can be employed in a fluid conveyance pipe having bending loads in addition to internal pressure loads and in structiral members having bending and axial stiffness requirements. In this construction, cylindrical filler wedges 124 of circumferentially wound composite materials are used to provide a smooth transition for the tube body layers passing into the embedment zone. Fabrication of this alternate construction is similar to that described above.

Figure 3:
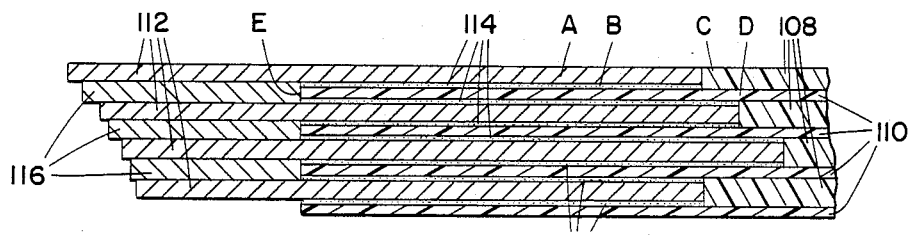
FIG. 3 is an expanded cross-section detail of the tube end containing embedded shells of FIGS. 1 and 2 as it would be prior to fusion welding to an end fitting.

In the embodiment of FIG. 4, cylindrical metal sleeves 126 as in the embodiment of FIGS. 1, 2 and 3, have cylindrical adhesive layers which are depicted as 128. The adhesive layers 128 are applied during fabrication of the tube 120. The adhesive is a polymeric resin mixture containing a thixotropic agent and is applied by means of filming, rolling or spraying to a precisely controlled thickness. The adhesive cures during the heated cure process of making the composite tube. Upon completion of fabrication of the tube, spaced cylindrical sleeves 130 that are integral with an end fitting 132 are inserted respectively between each of the pairs of adjoining sleeves 126 as well as cylindrically adjacent the unpaired sleeve thereof as shown. The ends of the sleeves abut the respective ends of each adjacent pair of fibrous layers 118. The spacer sleeves 130 are braze welded together with metal sleeves 126 circumferentially about the tube of the embodiment illustrated in FIG. 4.

Figure 5:
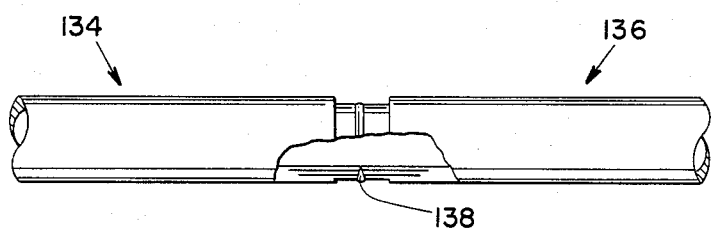
FIG. 5 is a longitudinal view, partially cut away, of two tubes each of which contain embedded shells. The shells are joined by a fusion weld of the extended shells.

FIG. 5 shows an alternate method of joining two tubes. Tubes 134, 136 join through a fusion weld 138. Each of tubes 134, 136 contains embedded metal sleeves seen better in FIG. 6 which is a detail cross-section of this joint. The weld 138 is used to join the extended regions of the embedded sleeves of each tube directly and without the use of intermediate fittings. This method has application to the permanent joining of tubes where disassembly or unjoining is not necessary thereby decreasing cost of joining and decreasing the weight of the joint.

Figure 6:
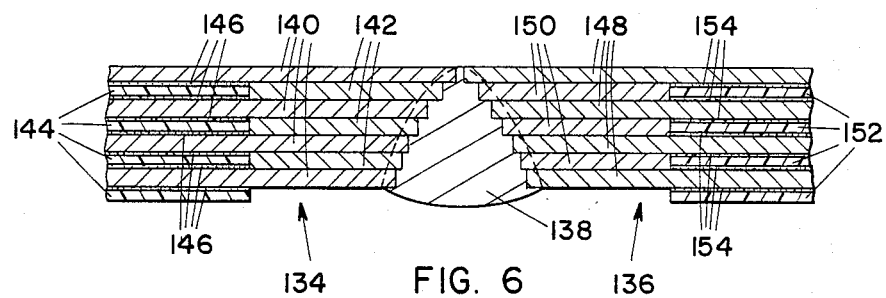
FIG. 6 is a cross-section detail of the two tube ends depicted in FIG. 5 which are joined directly by a fusion weld in the region of the extended shells.

In FIG. 6, tube 134 has cylindrical metal sleeves 140; cylindrical metal spacers 142 are respectively between the adjacent pairs of these cylindrical metal sleeves 140. Tube 134 also has helical layers of filaments, the helical layers shown as 144. Also helical layers 144 are bonded to the cylindrical metal sleeves through adhesive layers 146 in which the bonding is accomplished as discussed hereinbefore. Similarly, tube 136 has cylindrical metal sleeves 148 and cylindrical metal spacers 150 between pairs of them as shown. Also tube 136 similarly has helical layers of filaments in a hardened resin matrix, the helical layers shown as 152 bonded to cylindrical metal sleeves 148 through adhesive layers 154.

Figure 7:
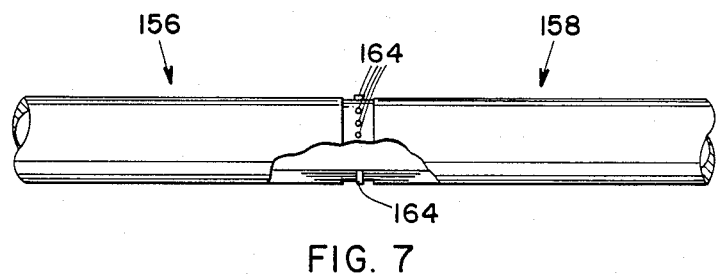
FIG. 7 is a longitudinal view, partially cut away of two tubes each of which contain embedded shells. The tubes are joined directly by radial pins through the extended shells.
Figure 8:
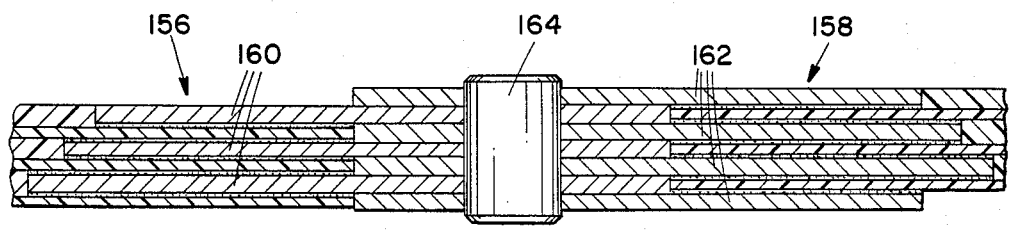
FIG. 8 is a cross-section detail of the two tube ends joined by radial pins through the extended shells as in FIG. 7.

FIG. 7 shows still another method of joining two substantially cylindrical tubes 156, 158. Tubes 156, 158 respectively contain embedded hollow, open ended, cylindrical metal sleeves 160 and 162 which are attached, by means of pins 164 as illustrated or by bolts or rivets. A detail cross-section of this joint is shown in FIG. 8 illustrating the embedment construction of each of the two tubes and being similar to that initially described above. In this method, however, the sleeves 160 of tube 156 are located radially so as to be staggered relative to the sleeves 162 of the other tube 158 thereby permitting those of one to engage between those of the other. The pins 164, are inserted around the joint circumference. Pins 164 are placed through corresponding holes in each extended sleeve in order to transfer axial compression, axial tension or torsional loads between the sleeves 160 of tube 156 to or from the sleeves 162 of the tube 158. This method has application to the joining of tubes where disassembly or unjoining is necessary and does not require the use of an intermediate fitting.

Figure 9:
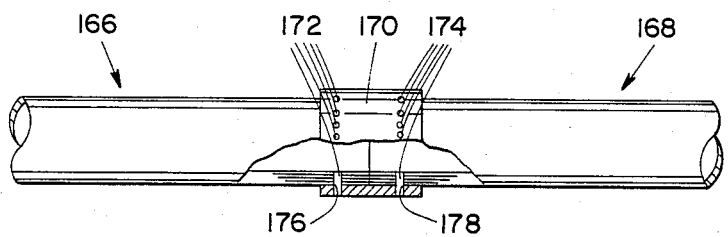
FIG. 9 is a longitudinal view, partially cut away, of two tubes each of which contain embedded shells. The tube ends are joined by means of an intermediate coupling by radial pins through the shell embedments.
Figure 10:
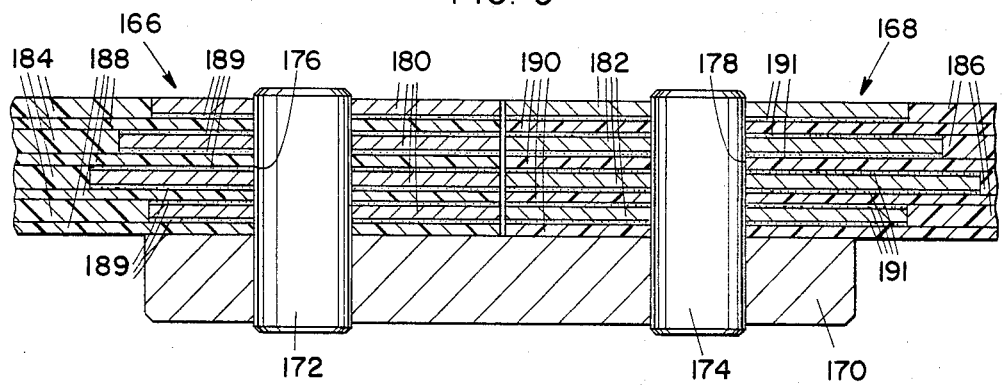
FIG. 10 is a cross-section detail of the two tube ends joined through an intermediate coupling by radial pins through the shell embedments as in FIG. 9.

A modification within the present invention is shown in FIG. 9 which illustrates two tubes 166, 168 being joined by means of cylindrical metal coupling 170. The coupling 170 is connected to each tube end by pins 172, 174 as shown or by bolts or rivets in the zone of embedded shells which attachment means extend through holes such as 176, 178 in the zone. This modification is simple in construction and requires an external fitting. FIG. 10 shows this modification in greater detail. Cylindrical metal sleeves of tube 166 are identified as 180 and 182 in tube 168. Layers 184, 186 of filaments terminate against the respective ends of metal sleeves 180, 182. Layers 188, 190 co-terminate with respective metal sleeves 180, 182 at the end of tube 166, 168 and are bonded to metal sleeves by adhesive layers 189, 191.

Figure 11:
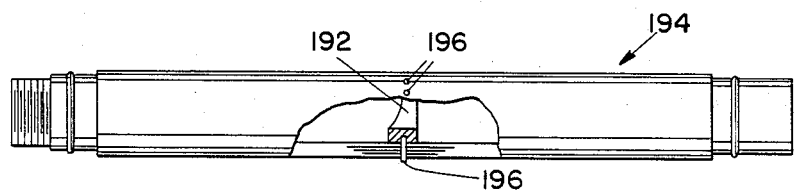
FIG. 11 is a longitudinal view, partially cut away, of an intermediate tube region which contains an internal bulkhead joined to the tube by radial pins through a shell embedded zone within the tube body.

A variation of this same modification wherein a pin connection is used in the embedded shell zone is shown in FIG. 11. In this variation, an internal bulkhead is joined to the tube body and is for the purpose of providing separate pressure compartments as would be used for pressure regulation, throttling, and flow control of fluids in a pipe system.

Figure 12:
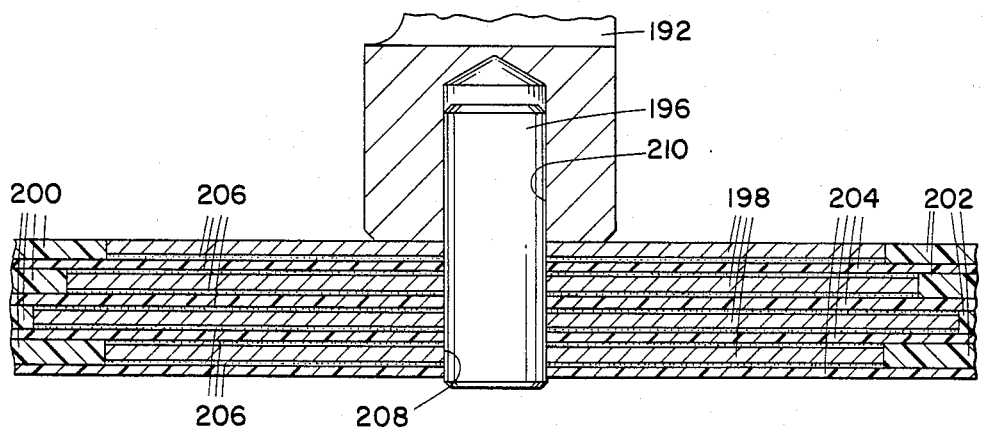
FIG. 12 is a cross-section detail of the intermediate tube region showing a portion of the bulkhead joined to the tube by radial pins through the shell embedded zone as in FIG. 11.

In FIG. 11 and as shown in greater detail in FIG. 12, bulkhead 192 is attached within tube 194 by means of pins 196.

Tube 194 of FIGS. 11 and 12 has open ended, cylindrical metal sleeves 198 terminating at filament wound layers 200 at a first end thereof and terminating at filament wound layers 202' at the second end thereof. Filamentary layers 204 are bonded to metal sleeves 198 through adhesive layers 206. Pin 196 extends through a hole such as 208 in metal sleeves 198, filamentary layers 204 as well as adhesive layers 206. Pins 196 also extend into holes such as 210 of bulkhead 192 to mount rigidly bulkhead 192 within tube 194. The embodiment shown in FIGS. 11 and 12 is made by a fabrication process such as described above.

Figure 13:
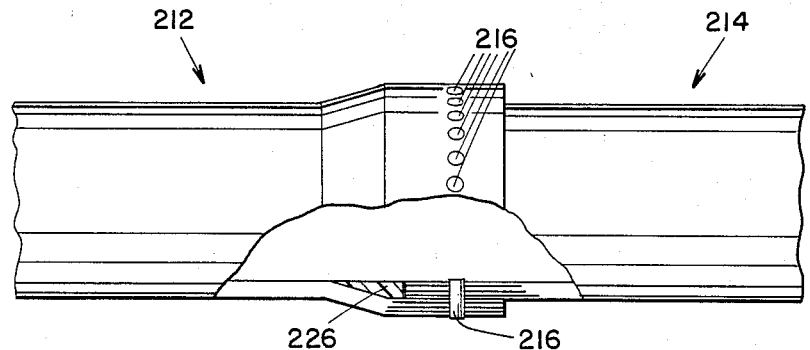
FIG. 13 is a longitudinal view, partially cut away, of two tube ends each of which contain embedded shells. The tubes are joined directly by radial pins through the shell embedments.
Figure 14:
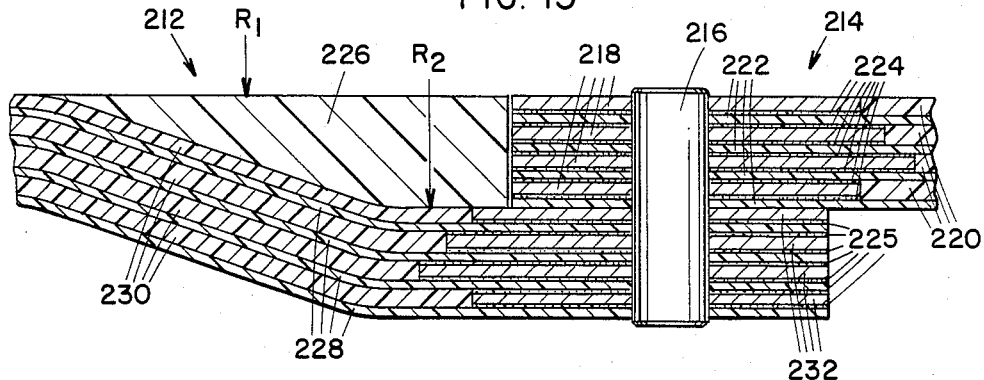
FIG. 14 is a cross-section detail of the two tube ends which are joined directly by radial pins in the region of the shell embedments as in FIG. 13.

FIG. 13 and FIG. 14, a detail of FIG. 13, shows joining of two tubes 212 and 214 together by means of a lap joint made in accordance with this invention. Connection of the ends of each tube is by pins 216 as shown or by bolts or rivets in and through the embedded shell zones of both tube ends. The end of tube 212 is enlarged outward to pass over the outside diameter of the other tube 214. Tube 214 is fabricated as described above. Tube 214 has open ended, cylindrical metal sleeves 218, layers 220 of filaments in a hardened resin matrix that are circumferential, layers 222 of filaments in a hardened resin matrix that are relatively axial and adhesive layers 224.

Fabrication of tube 212 is facilitated by the insertion of a tapered, cylindrical spacer 226 on the filament winding mandrel together with a tool ring having the same diametrical dimensions of the spacer and extending into the region which is later occupied by the overlap of tube 212 over tube 214. Layers 228 and 230 of the tube 212 are filament wound; and metal sleeves 232 are embedded in adhesive layers 225 in the same manner as described above being also outward and over the spacer and tool ring. A limitation exists as to the maximum slope of the spacer 226 which can be filament wound and is a function of the ply helix angle. This function in terms of the slope axial length X is:

$$X_{minimum} = R_1/(R_2 \sin \alpha)[R_2^2 - R_1^2]^{1/8}$$

where $R_1$ is the inside radius of the tapered spacer 226 (such inner radius shown as $R_1$ in FIG. 14) and $R_2$ is the outside radius of the taper spacer (such outer radius shown as $R_2$ in FIG. 14) and $\alpha$ is the helix angle of the ply.

A primary advantage of this invention concerns the magnitude of load which can be transferred from or to the tube body through the shell embedded zone. This magnitude is equal to or greater than the maximum strength of the tube body owing to the multiplicity of shells each of which transfer load directly from or to each ply of the tube.

Another advantage concerns the use of metal shells which can be fusion or braze welded thereby having the advantages of lower cost and pressure sealing of the weld connection. The metal shells can also be pinned, bolted or riveted in the region of the extended shells or in the zone of the embedment thereby having the advantages of the very high bearing strength capability exhibited by metals.

Another advantage concerns the thickness of the entire joint region. The fusion welded joint and the pinned joint permit joining of two tubes without exceeding the outside diameter of the tube body. This has significant advantages to oil field tube applications such as drill stems, risers, production packers, and casings used in deep well drilling where flow rate is increased by internal diametral profile enlargement; and to rocket motor applications where aerodynamic performance is enhanced by external diametral profile reductions.

Figure 15:
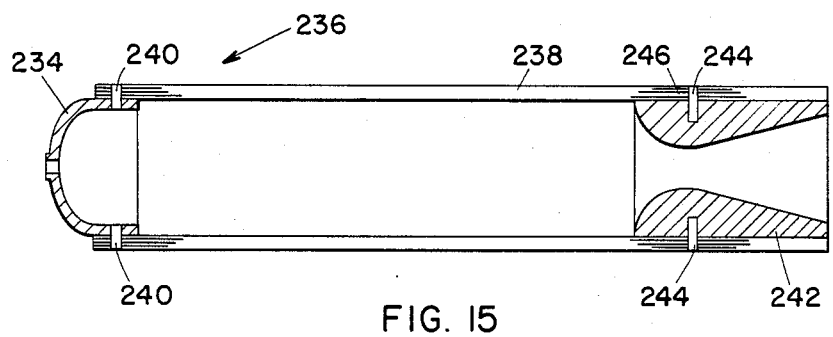
FIG. 15 illustrates a small size rocket motor case implementing aspects of this invention relating to fasteners.
Figure 16:
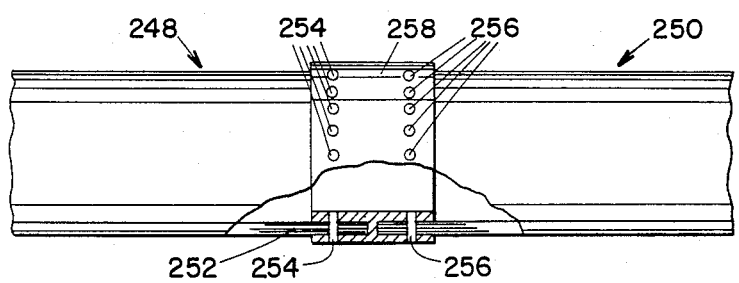
FIG. 16 illustrates a large size rocket motor case implementing aspects of this invention using both internal and external connectors.

Many of the uses of this invention are discussed in the above. FIGS. 15 through 19 show still other uses and variations. Uses of the pin interlaminate joint connection in the zone of the embedment are shown by FIGS. 15 and 16. FIG. 15 shows a tactical rocket motor: wherein the forward dome-shaped closure 234 is joined around forward cylindrical zone 236 to the rocket motor body 238 by pins 240 as shown or by bolts or rivets; and wherein the rocket nozzle 242 is joined to the body 238 by pins 244 in zone of embedment 246.

FIG. 16 shows an interlaminate joint as would be employed in the connection of the tubes of large rocket motors or the connection of large size tubes, or pipes. In this use, each tube 248, 250 containing embedded shells in zone of embedment 252 is connected by pin rows 254, 256 as shown or by bolts or rivets through an intermediate fitting 258 which has both internal and external connection members. By this means the fasteners are loaded by double shear planes providing a more favorable bending load in the fastener as would be required for thicker walls of larger tubes.

Figure 17:
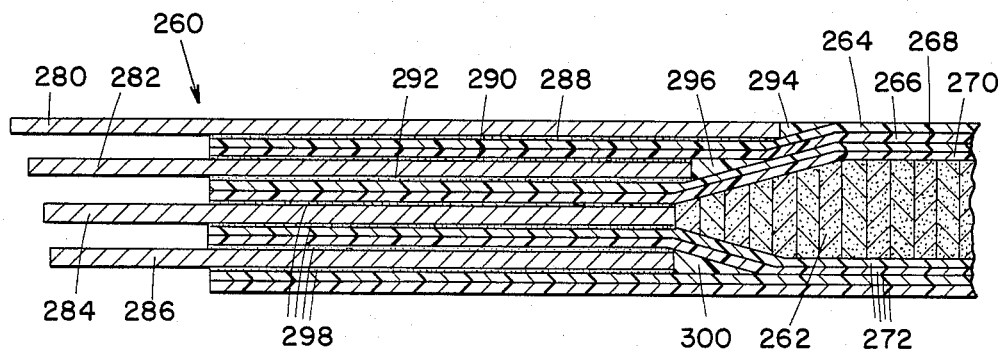
FIG. 17 illustrates use of this invention relative to sandwich constructed tubes.

FIG. 17 shown the tube end of an interlaminate tube body as used in joining composite tube wall 260 which is of sandwich construction. The core 262 being of honeycomb, foam or other suitable core material is contained between the inner sandwich skin layers 264 through 270 and the outer sandwich skin layers 272 of the tube body. The layers of both skins are taken around and between cylindrical metal sleeves 280 through 286 as illustrated.

The process of making the tube body 260 consists of three fabrication steps. The first step comprises the construction of the inner tube sandwich skin layers 264 through 270, together with the cylindrical metal sleeves 280 and 282, adhesive layers 288 through 292, and cylindrical filler wedges 294 and 296. In this first step, metal sleeve 280 having adhesive layer 288 applied to it, is positioned on a filament winding mandrel. This is followed by the circumferential filament winding of filler wedge 294 and then by filament winding of the first two tube body layers 264, 266, respectively. These layers are each first B-staged and then cut and the end material (axially away from the honeycomb location) of the filament wound layers is removed. The portion of the first step described to this point is repeated a number of times to construct the number of layers illustrated by FIG. 17. The second step comprises the construction of the sandwich core. The second step is performed by: the laydown of expanded honeycomb core, containing tapered end rebates, around and fitted to layer 270; or by the spraying of expanded foam core material directly to layer 270. The third step comprises the construction of the outer tube sandwich skin layers 272 together with the cylindrical metal sleeves 284 and 286, adhesive layers 298, and cylindrical filler wedge 300. The process for this third step is the same as the first step described above. After completion, the entire assembly is heated to thermally cure the resin matrix. After cooling the mandrel is removed.

Figure 18:
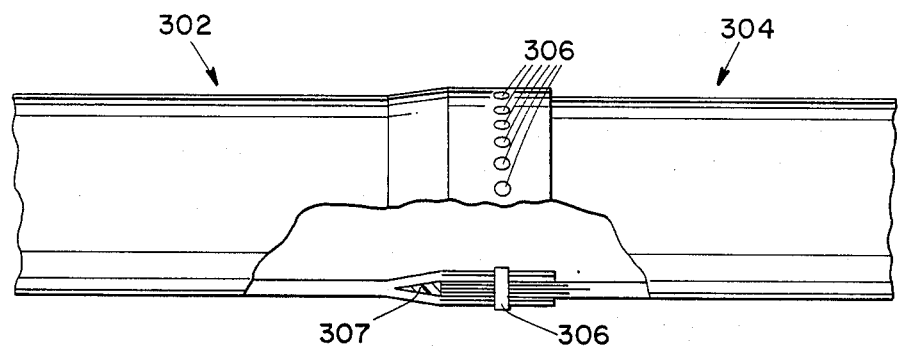
FIGS. 18 and 19 illustrate this invention as applied to joining tubes with integral shells.
Figure 19:
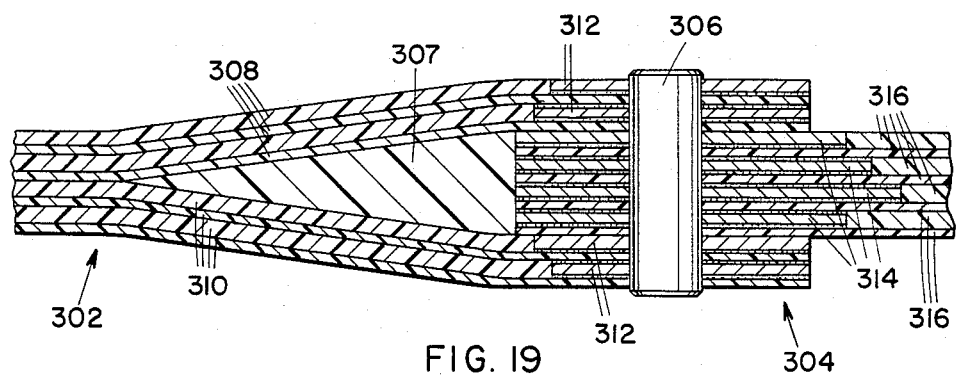

FIG. 18 shows and FIG. 19 details an interlaminate joint between tubes 302 and 304 as would be used in joining composite tubes of greater wall thicknesses by means of pins 306 as shown, or bolts or rivets. Tapered spacer 307 is used during manufacture of tube 302 to split the inner filamentary layers 308 and the outer filamentary layers 310 so as to load the pin 306 by double shear. Embedded cylindrical sleeves 312 are used accordingly to transfer loads between the pins 306 and tube layers 308. Similarly, shells 314 transfer loads to filamentary layers 316 in tube 304.

Definitions

Mandrel: A tool used in filament winding on which bands of fibers are deposited into particular filamentary patterns to form layers.

Filamentary Pattern: The geometric pattern formed by the filaments of a band being laid down on a mandrel along its center longitudinal axis.

Helix Angle: The geometric angle formed between the filament direction of bands and the center longitudinal axis of mandrel rotation, such angle being between about 5° and 75° in absolute value.

B-Stage: An intermediate state of a polymeric resinous material wherein the resin is highly immobile but not yet significantly crosslinked fully into a solid or hard state.

Cure: A state of a polymeric resinous material wherein the resin is crosslinked into a solid or hard state.

Filamentary materials: Fibers that are in the form of continuous filaments, examples of which are graphite fibers, carbon fibers, aramid fibers, glass fibers, or the like used in filament winding processes.

Relatively axially or helically positioned filamentary materials: Filamentary materials that with respect to a center longitudinal axis of a tube structure are at an angle between about 5° and 75° in absolute value.

Relatively circumferentially positioned filamentary materials: Filamentary materials that with respect to a center longitudinal axis of a tube structure are at an angle between about 80° and 90° in absolute value.

Layer of filaments or filamentary material: A group of continuous filaments disposed substantially at the same absolute angle relative to an axis or line parallel to an axis. Layer of filaments includes a ply or plies of such continuous filaments.

Adhesive: A polymeric resin preferably containing a thixotropic agent which is applied or used in a B-staged condition and which is cured to obtain a strong bond between adjacent parts or layers.

Load Bearing Shell: A metal or the like continuous sleeve which can transfer a load or portion of a load applied at a first location thereof to other locations within a composite tube that are in contact therewith.

Zone of Embedment: The tubular zone defined by the portion of composite tube that is commensurate with a hollow metal shell.

What is claimed is:

1. A joinable tube having a central axis and a filament wound portion, said joinable tube comprising:

a filament wound body that is the filament wound portion of said joinable tube, said filament wound body being composed of a tubular, filament wound, middle section integral between tubular, filament wound, first and second end sections of said tube, said first and second end sections adapted to be respectively connectable to first and second tubular members and transmit loads through such connections into said middle section;

said filament wound body being formed of (i) cylindrical first layers of high strength, filament wound fibers (a) disposed at about 80°–90° degrees in absolute value relative lines parallel said central axis and (b) extending around said central axis at said middle section and (ii) cylindrical second layers of high strength, filament wound fibers, said second layers alternating in radial direction with said first layers and (a) disposed at about 5°–75° degrees relative lines parallel said central axis and (b) extending around said central axis at said middle section and at said first and second end sections;

absences of said first layers in said first end section forming a plurality of cylindrical first end spaces respectively between said second layers in said first end section that are radially adjacent each other across the locations where said first layers are absent;

a plurality of cylindrically concentric, load bearing first shells embedded in said first end section, said first shells fitting respectively in said first end spaces;

each of said first shells having cylindrical inner and outer first shell surfaces, said first shell surfaces covered with adhesive so as to bond said first shells in said first end section to respectively adjacent cylindrical surfaces of said second layers that form said respective first end spaces in said first end section;

absences of said first layers in said second end section forming a plurality of cylindrical second end spaces respectively between said second layers in said second end section that are radially adjacent each other across the locations where said first layers are absent;

a plurality of cylindrically concentric, load bearing second shells embedded in said second end section, said second shells fitting respectively in said second end spaces;

each of said second shells having cylindrical inner and outer second shell surfaces, said second shell surfaces covered with adhesive so as to adhesively bond said second shells in said second end section to respectively adjacent cylindrical surfaces of said second layers that form said respective second end spaces in said second end section.

2. The joinable tube of claim 1, wherein said first shells extend beyond said first end section away from said filament wound body for connection of said joinable tube to said first tubular member; and said second shells extend beyond said second end section away from said filament wound body for connection of said joinable tube to said second tubular member.

3. The joinable tube in accordance with claim 2, wherein said first and second shells are made of material comprising metal.

4. The joinable tube of claim 3, wherein cylindrical first spacers fit between respective gaps between those portions of said first shells that extend beyond said first end section, said spacers being adapted to be welded to said first shells in connecting said joinable tube to said first tubular member.

5. The joinable tube in accordance with claim 1, wherein said first end section has holes extending radially through the walls thereof toward said central axis, said holes being adapted to receive pins that connect said joinable tube to said first tubular member.

6. The joinable tube of claims 1 or 2 wherein said central axis extends within said first end section and wherein there is an innermost first shell, said innermost first shell being radially closest to said central axis in said first end section.

* * * * *